(12) United States Patent
Slegers et al.

(10) Patent No.: US 10,701,781 B2
(45) Date of Patent: Jun. 30, 2020

(54) PROGRAMMING RULES FOR CONTROLLING LIGHTING BASED ON USER INTERACTIONS WITH ONE OR MORE ACTUATORS IN ONE OR MORE ZONES

(71) Applicant: SIGNIFY HOLDING B.V., Eindhoven (NL)

(72) Inventors: Walter Slegers, Eindhoven (NL); Remco Magielse, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/315,397

(22) PCT Filed: Jul. 5, 2017

(86) PCT No.: PCT/EP2017/066788
§ 371 (c)(1),
(2) Date: Jan. 4, 2019

(87) PCT Pub. No.: WO2018/007450
PCT Pub. Date: Jan. 11, 2018

(65) Prior Publication Data
US 2019/0313509 A1    Oct. 10, 2019

(30) Foreign Application Priority Data
Jul. 8, 2016 (EP) .................................. 16178629

(51) Int. Cl.
*H05B 47/105* (2020.01)
*G05B 19/042* (2006.01)
*H05B 47/19* (2020.01)

(52) U.S. Cl.
CPC ......... *H05B 47/105* (2020.01); *G05B 19/042* (2013.01); *H05B 47/19* (2020.01); *G05B 2219/25011* (2013.01)

(58) Field of Classification Search
CPC ............ H05B 37/0272; H05B 37/0227; H05B 37/0245; H05B 37/0281; H05B 37/029;
(Continued)

(56) References Cited

U.S. PATENT DOCUMENTS 9,967,952 B2 * 5/2018 Pandharipande .... H05B 47/105
10,326,607 B2 * 6/2019 Sasaki ................. G06F 3/04847
(Continued)

FOREIGN PATENT DOCUMENTS

WO    WO2015130475 A1    9/2015
WO    WO2016019005 A1    2/2016

*Primary Examiner* — Tung X Le
*Assistant Examiner* — Borna Alaeddini
(74) *Attorney, Agent, or Firm* — Meenakshy Chakravorty

(57) ABSTRACT

A method of programming a respective rule for controlling lighting in each of one or more zones each being occupiable by a user. The method comprises: detecting that a user has actuated one or more actuators serving a zone presently occupied by the user; receiving a user selection through a user interface of a user terminal, to select one or more illumination sources arranged to illuminate the zone presently occupied by the user; and 5 based on this detection and user selection, automatically programming a respective rule into a memory in association with the one or more actuators, the rule specifying how the illumination emitted by the one or more selected illumination sources is to be controlled as a function of a subsequent instance of said user interaction.

10 Claims, 6 Drawing Sheets

(58) Field of Classification Search
CPC ............... H05B 37/0218; H05B 37/02; H05B 37/0254; H05B 37/0209; H05B 37/0236; H05B 37/0263; H05B 41/36; H05B 41/38; H05B 33/0863; H05B 33/0845; H05B 33/0854; H05B 33/08; H05B 33/0857; H05B 33/0866; H05B 47/19; H05B 47/105; G08C 2201/93; G08C 2201/30; G08C 2201/20; G08C 2201/40; G08C 2201/91; G05B 18/042; G05B 2219/25011

See application file for complete search history.

(56) References Cited

U.S. PATENT DOCUMENTS

| | | | |
|---|---|---|---|
| 2012/0242247 A1* | 9/2012 | Hartmann | H05B 33/0863 315/294 |
| 2012/0284672 A1 | 11/2012 | Madonna et al. | |
| 2015/0332586 A1 | 11/2015 | Hamm et al. | |
| 2015/0341184 A1 | 11/2015 | Tatzel et al. | |
| 2015/0382436 A1 | 12/2015 | Kelly et al. | |
| 2016/0170389 A1 | 6/2016 | Im et al. | |
| 2018/0336002 A1* | 11/2018 | Hansen | H05B 37/0236 |

\* cited by examiner

PROGRAMMING RULES FOR CONTROLLING LIGHTING BASED ON USER INTERACTIONS WITH ONE OR MORE ACTUATORS IN ONE OR MORE ZONES

CROSS-REFERENCE TO PRIOR APPLICATIONS

This application is the U.S. National Phase application under 35 U.S.C. § 371 of International Application No. PCT/EP2017/066788, filed on Jul. 5, 2017, which claims the benefit of European Patent Application No. 16178629.8, filed on Jul. 8, 2016. These applications are hereby incorporated by reference herein.

TECHNICAL FIELD

The present disclosure relates to the programming of rules for controlling the illumination emitted by illumination sources in response to the actuation of user-actuated actuators such as switches or presence sensors.

BACKGROUND

US 2016/170389 A1 discloses using an external programming terminal to program smart buttons.

US 2015/332586 A1 discloses using a graphical user interface to program smart buttons.

Connected lighting refers to a system of one or more luminaires which are controlled not by (or not only by) a traditional wired, electrical on-off or dimmer circuit, but rather by using a data communications protocol via a wired or more often wireless connection, e.g. a wired or wireless network. Typically, the luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). The lighting control device may take the form of a user terminal, e.g. a portable user terminal such as a smartphone, tablet, laptop or smart watch; or a static user terminal such as a desktop computer or wireless wall-panel. In such cases the lighting control commands may originate from an application running on the user terminal, either based on user inputs provided to the application by the user through a user interface of the user terminal (e.g. a touch screen or point-and-click interface), and/or based on an automatized function of the application. The user equipment may send the lighting control commands to the luminaires directly, or via an intermediate device such as a wireless router, access point or lighting bridge.

Home automation systems are now being proposed in which the functionality of the system can be managed by end-users, such as to enable the user him- or herself to define what switches and/or sensors will trigger what luminaires to exhibit what behavior. For example an application (or "app") running on a mobile user terminal such as a laptop, tablet, smartphone or smart watch, or a status user terminal such as a desktop computer, may be used by non-technical users to configure the behavior of an automated home lighting system.

SUMMARY

Programming a home automation system should indeed ideally be a user action, so it can be tailored towards the specific application context. A difficulty in realizing this, however, is in providing a mechanism that enables an end-user without technical expertise to readily create usable, understandable home automation patterns.

According to one aspect disclosed herein, there is provided method of programming a respective rule for controlling lighting in each of one or more zones each being occupiable by a user, the method comprising: (a) detecting that a user has performed a first instance of a user interaction with one or more user-actuated actuators serving the zone presently occupied by the user, the user interaction comprising at least one actuation of each of the one or more actuators (e.g. pressing a physical switch, such as a wall switch, or triggering a presence sensor); (b) receiving a user selection through a user interface of a user terminal, the user selection selecting one or more illumination sources arranged to illuminate the zone presently occupied by the user (e.g. selecting the sources through lighting control app running on a mobile device carried by the user); and (c) based on said detection and user selection, automatically programming the respective rule into a memory in association with the one or more actuators, the rule specifying how the illumination emitted by the one or more selected illumination sources are to be controlled as a function of a subsequent instance of said user interaction; wherein the method further comprises, on a subsequent occasion following the performance of (a), (b) and (c), reading said rule from the memory in order to automatically enact the rule in response to the subsequent instance of the subsequent interaction and thereby control the illumination.

Thus there is provided a system which learns from the end-user performing the actual actions he or she intends to have trigger certain lighting events in different regions around the home, office, or the like. For instance the zones may be rooms of the user's home. In this case the user may walks around his or her home pressing lighting switches and/or triggering presence sensors, and assigning a lighting response to each switch or sensor as he or she does so, e.g. through a lighting control app on a smartphone or tablet. This provides a much more intuitive mechanism for a user to program a lighting system.

In particularly preferred embodiments, the method comprises: (d) upon the receipt of said user selection, automatically controlling the one or more selected illumination sources to emit illumination in accordance with said rule, thereby demonstrating to the user the rule being programmed (wherein said subsequent occasion follows (a), (b), (c) and (d)).

Hence in embodiments, the invention advantageously provides the user with a method of learning by doing. I.e. by the user actually controlling the selected light source or sources in the manner that he or she wishes, including actually causing them to emit the desired lighting effect, the system automatically remembers this so that the next time the user actuates the same actuator (e.g. a physical switch, such as a wall switch, a sensor, etc.) then this will automatically have the same function.

Note that steps (a), (b), (c) and (d) do not necessarily have to be performed in any particular order, except that (c) and (if used) (d) must causally-speaking come after (a) and (b). Therefore (b) may be performed after (a), or (a) may be performed after (b); and (c) may be performed after (d), or (d) may be performed after (c).

Note also that the memory comprises one or more memory units of one or more storage media, and where it is said a certain piece of information is stored in "the" memory, or such like, this does not necessarily mean stored in the same one of the memory units as a previously-recited one of the pieces of information stored in the memory (though it could be).

In embodiments, said one or more zones are a plurality of zones (e.g. rooms of a house, areas of a garden, etc.) and the method comprises repeating operations (a), (b) and (c) to program the respective rule in each of the plurality of zones.

In embodiments, the method may further comprise: presenting a start control and a stop control to the user though the user interface, activating a record mode when the user activates the start control, and ending the record mode when the user activates the stop control; wherein the repeated performance of (a), (b) and (c) (and optionally (d)) is automatic on condition of the record mode being activated, so as to automatically program the respective rules for the zones visited by the user during the record mode; whereas when the record mode is deactivated then the subsequent instance of said user interaction automatically invokes the enacting of said rule to control the illumination. In embodiments the record may be deactivated either manually or automatically, e.g. automatically after a time out.

In embodiments, the method may further comprise: during the record mode, storing in the memory a record of the zones visited by the user and/or the actuators for which one of said rules has already been programmed; and when the user returns to one of the zones for which the respective rule is already programmed, recalling said record from memory in order to avoid reprogramming the respective rule.

In embodiments, the user interaction may comprise multiple actuations by the user of at least one of the one or more actuators, and said function may comprise a different respective action to be triggered by each of the multiple actuations.

In embodiments, the automatic programming of the rule is performed on condition that the multiple actuations are performed within a predetermined time window relative to one another.

In embodiments, the automatic programming of said rule may be performed on condition that the user selection and the first instance of the user interaction are performed within time window relative to one another.

In embodiments, at least one of said one or more actuators may comprise a switch, button, dial or slider; and the user interaction comprises the user pressing the switch or button, turning the dial or sliding the slider, respectively. The switch, button, dial or slider may be a physical switch, physical button, physical dial or physical slider, respectively. For example, a wall switch. In other words, the actuator is a real object and not a virtual object that is part of a graphical user interface. In embodiments, at least one of said one or more actuators may comprise a presence sensor, and said user interaction comprises the user being sensed by the presence sensor.

In embodiments, the method may comprise receiving a user input through the user interface specifying a value of a parameter qualifying an additional condition of the rule. E.g. the parameter may be time of day, the value being a time or a range of times, this qualifying the rule in that the rule only applies before or after the user specified threshold time or within or outside the user specified range of times, or the rule comprises different variants which are applied depending on whether the current time of day is inside or outside the user specified range.

In embodiments, the method may comprise receiving a user input through the user interface, the user input selecting the rule from a set of predefined templates. In embodiments, the rule may be defined by a predetermined template sourced from a rule created by one or more other users.

Thus the user can be aided in creating home automation rules by reusing home automation behavior created by other apps or users on their respective systems, or from shared behavior of other cloud connected systems.

According to another aspect disclosed herein, there is provided a computer-program product comprising code embodied on computer-readable storage and configured so as when run on one or more processing units to perform operations in accordance with the method of any embodiment disclosed herein.

According to another aspect disclosed herein, there is provided lighting control equipment comprising a controller configured to perform operations in accordance with the method of any embodiment disclosed herein. According to another aspect there is provided a lighting system comprising the lighting control equipment and the light sources, the light sources being coupled to the lighting control equipment via a wired and/or wireless connection in order to enable the control of the light sources.

BRIEF DESCRIPTION OF THE DRAWINGS

To aid understanding of the present application and to show how embodiments may be put into effect, reference is made by way of example to the accompanying drawings in which.

DETAILED DESCRIPTION OF EMBODIMENTS

Figure 1:
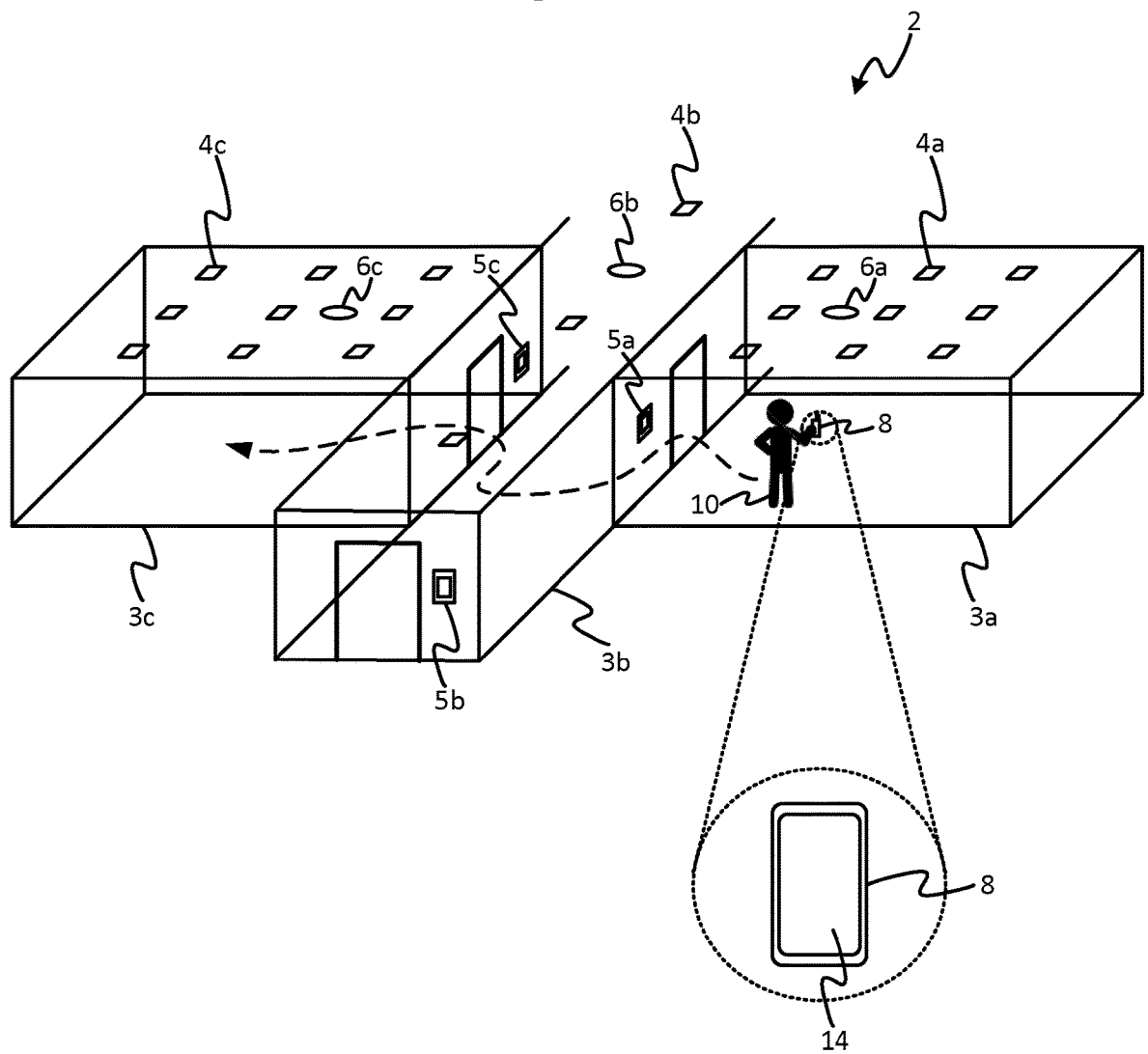
FIG. 1 is a schematic illustration of an environment comprising a plurality of zones each occupiable by a user and each illuminated by respective illumination sources.

FIG. 1 illustrates an example of an environment 2 in which embodiments disclosed herein may be applied. The environment 2 may comprise any indoor, outdoor and/or partially covered space such as the interior of a building, a garden and/or a gazebo, respectively. Furthermore the environment 2 is divided into a plurality of different zones 3 fit to be occupied by a human user 10, e.g. rooms of a house or different areas of a garden. The illustrated example shows part of the interior of a user's home (house or apartment) comprising three rooms, e.g. say a living room 3a, a kitchen 3c and a corridor 3b between them. More rooms may also be involved but only three are shown for illustrative purposes. Embodiments may be described in terms of an example in which the zones 3 are rooms, but it will be appreciated that this is not limiting and the teachings herein may apply to other scenarios such as different areas in a user's garden.

Each of the rooms 3 is equipped with a respective one or more illumination sources 4 in the form of one or more luminaires, arranged to illuminate the respective room 3. Each of the luminaires 4 comprises one or more lamps (i.e. the actual light emitting component or components) plus any associated housing, socket and/or support. In the illustrated example the luminaires 4 are mounted on the ceiling of the rooms 3, but alternatively or additionally, one, some or all of the luminaires 4 may take other forms such as wall-mounted luminaires, wall washers, free-standing luminaires, task lighting, or less conventional forms such as a luminous panel embedded in an item of furniture.

The user 10 has a mobile user terminal 8 disposed about his or her person, e.g. held in the hand, or worn on the user's body. In embodiments the user terminal 8 may for example take the form of a smartphone, tablet or even smartwatch. As will be discussed in more detail shortly in relation to FIG. 2, the user terminal 8 comprises a user interface 14 through which the user 10 can control the light emitted by the luminaires 4. Typically the user interface 14 takes the form of a touch screen, but other forms are not excluded (e.g. an audio interface with voice recognition).

Each of the rooms 3 is also equipped with at least one respective actuator 5, 6 suitable for use to control one, some or all of the luminaires 4 in the environment 2. For example the actuator(s) in each given room 3 may comprise one or more hand-actuated actuators 5 such as light switches, buttons and/or dials or sliders (e.g. dimmers), which may for instance be mounted on an interior wall of the room. Each of the light switches 5 may for example take the form of a wireless "smart switch". As another example one or more of the actuators 5 may comprise a power plug and socket, with the system comprising detection means (not shown) to detect when the user actuates or de-actuates an illumination source 4 by plugging the plug into a power socket or unplugging the plug from the socket, respectively, and to output a "turn on" or "turn off" signal when this is detected. The following will be described by way of example in terms of switches, but it will be appreciated that these could equally take the form of buttons, sliders, rotational dials or such like. In general any means that has the capability to detect when a lamp is switched on and off may be used as an actuator. Note also that the actuator does not necessarily have to be in the same room as the illumination source which it is to control. E.g. for an illumination source in garden, the (or another) switch or other actuator may be located in a room inside the house.

Alternatively or additionally, actuator(s) in each given room 3 may comprise one or more presence sensors 6 arranged to detect presence of the user upon entering the room. Each of the presence sensors 6 may take any of a variety of forms, the form of a passive infrared sensor, active ultrasound sensor, or a 2D or 3D (depth aware) camera. Further, the presence sensor 6 may detect presence of a person 10 based on any of a variety of criteria, for example based on detecting motion using the Doppler effect and assuming this is the movement of a living being, or by using an image recognition algorithm to recognize a human face or the shape of a human body in the images captured by a camera. Another form of presence sensor comprises a wearable device worn about the user's person, which reports when the user 10 is in a given room 3. Various forms of presence sensor are in themselves familiar to a person skilled in the art and for conciseness the detailed workings of presence sensors will not be reproduced here.

Figure 2:
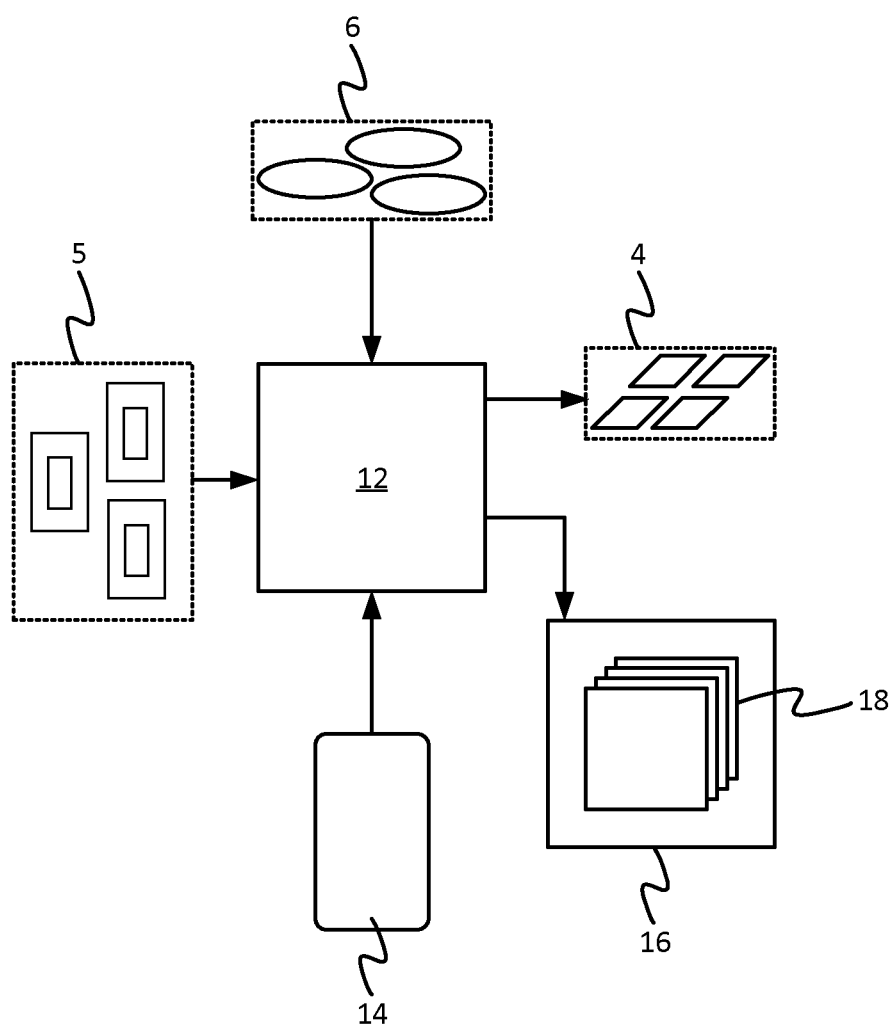
FIG. 2 is a schematic block diagram of a system for programming a rule for controlling the illumination emitted by an illumination source.

FIG. 2 illustrates a system according to embodiments of the present disclosure by which the user 10 can define, in a user-friendly manner, which of the actuators 5, 6 controls which of the luminaires 4, and what effect this will have. In addition to the components already described in relation to FIG. 1, the system comprises a controller 12, and a storage location 16 (i.e. memory) for storing one or more lighting control rules 18.

The controller 12 is operatively coupled to each of the luminaires 4, the light switches 5 and/or the presence sensors 6, the user interface 14 of the mobile device 8, and the storage 16. Via the respective coupling, the controller 12 is thereby arranged to be able to control each of the luminaires 4, to receive inputs from each the switches 5 and/or presence sensors 6, to receive user inputs from the user 10 and output content to the user 10 through the user interface 14, and to store values of the lighting control rules 18 in the storage location 16. The manner in which the various components 4, 5, 6, 14, 16 are coupled to the controller 12 in order to enable this functionality may be implemented in using any of a variety of possible wired and/or wireless connections, for example as follows. The controller 12 itself may also be implemented in any of a number of possible forms and at any of a number of possible physical locations.

In embodiments the controller 12 is implemented in the form of code stored on a memory and arranged to be run on a processing apparatus (and the memory on which the controller 12 is stored may comprise some or all of the same memory the storage location 16 storing the lighting control rules 18, or a different memory). The processing apparatus on which the controller 12 is run may comprise one or more processing units at one or more physical locations (distributed processing techniques are in themselves known in the art).

Similarly the memory on which the controller 12 is stored may comprise one or more memory units located at one or more physical locations, as may the memory 16 on which the lighting control rules 18 are stored. E.g. either or both memories may be implemented in the form of one or more magnetic memory units such as a hard disk which use a magnetic storage medium, and/or one or more electronic memory units such as an EEPROM (or "flash" memory) which use an electronic storage medium, and/or even one or more optical storage units which use an optical storage medium. Further, note that the physical locations at which the processing apparatus and either or both memories are located may be the same or different.

Alternatively it is not excluded that the controller 12 may be implemented in the form of dedicated hardware circuitry, or configurable or reconfigurable hardware circuitry such as a PGA (programmable gate array) or FPGA, or any combination of hardware or software.

In embodiments, the controller 12 may comprise a lighting control application (or "app") installed on a local memory of the mobile user terminal 8 and arranged to run on a local processing apparatus of the mobile user terminal 8 (i.e. a memory and processing apparatus included in the mobile user terminal 8). In this case the controller 12 receives inputs from, and outputs content to, the user interface 14 via an internal wired connection between the controller 12 and user interface 14—typically a touch screen. To control the luminaires 4, the controller 12 controls these via an at least partially wireless connection between the mobile terminal 8 and each of the luminaires 4, either via a direct wireless connection or via one or more intermediate components such as a wireless access point, lighting bridge, buildings controller or server (not shown). This connection could be wireless all the way from the mobile terminal 8 to the luminaires 4, or may comprise a wired leg between the intermediate component and the luminaires 4. For example in embodiments the controller 12 may control the luminaires 4 via an individual direct wireless connection between the mobile terminal 8 and each of the luminaires 4, e.g. a ZigBee, Bluetooth or Wi-Fi connection. Alternatively the mobile device 8 may form a wireless connection via a wireless local area network (WLAN), e.g. via a lighting bridge or wireless access point. Or the mobile device 8 may connect to an intermediate component such as an access point, lighting bridge, buildings controller or server and then onwards from there to the luminaires 4 via a wired connection such as a local Ethernet or DMX network, or via the Internet.

To receive inputs from the switches 5 and/or sensors 6, the controller 12 again uses an at least partially wireless connection between the mobile device 8 and each of the switches 5 and or sensors 6. This could be via the same type of connection as that used to control the luminaires 4, or a different type of connection. E.g. the controller 12 may receive inputs from the switches 5 and/or sensors 6 either via a direct wireless connection or via one or more intermediate components such as a wireless access point, lighting bridge, buildings controller or server (not shown). This connection could be wireless all the way between the mobile terminal 8 and switches/sensors 5, 6, or may comprise a wired leg between the intermediate component and the switches/sensors 5, 6. For example in embodiments the controller 12 may receive the inputs from the switches 5 and/or sensors 6 via an individual direct wireless connection between the mobile terminal 8 and each of the switches 5 and/or sensors 6, e.g. a ZigBee, Bluetooth or Wi-Fi connection. Alternatively the mobile device 8 may form a wireless connection via a wireless local area network (WLAN), e.g. via a lighting bridge, or wireless access point. Or the mobile device 8 may connect to an intermediate component such as an access point, lighting bridge, buildings controller or server, with the connection completed via a second, wires leg such as via a local Ethernet or DMX network, or via the Internet.

When the controller 12 is implemented on the user terminal 8, the memory 16 used to store the lighting control rules 18 may comprise the (or a) internal memory of the user terminal 8, or may comprise a remote (external) memory such as on a server. In the latter case the controller 12 may be configured to read and write from the memory 18 via a connection over any wired and/or wireless network, e.g. via a WLAN, a local Ethernet network, a mobile cellular network and/or the Internet.

In alternative embodiments, the controller 12 may be implemented on a central control equipment external to the mobile device 8, e.g. on a server, building controller or lighting bridge, and may merely be accessed through the user interface 14 on the terminal 8. In this case the controller 12 may form the connections with the luminaires 4, switches 5 and/or sensors 6 for the purposes disclosed herein via any suitable wired and/or wireless network, for example via the Internet, via a mobile cellular network, via a WLAN in the locality of the environment 2 (e.g. using Wi-Fi, ZigBee or Bluetooth), and/or via a local Ethernet network in the locality of the environment 2. For instance, in one example the controller 12 may be implemented on a lighting bridge (not shown) located physically in the environment 2, and which directly connects to each of the luminaires 4, the switches 5 and/or sensors 6, and the user interface 14 on the mobile device 8 via a direct wireless connection with each (e.g. a ZigBee connection) or via a local wireless network such as a Mesh network (e.g. again using ZigBee). As another example, the controller 12 may be implemented on a server (again not shown), which may comprise one or more physical server units located at one or more geographical sites. E.g. the controller 12 may be hosted on the cloud. In such cases the controller 12 may again connect from the server to each of the luminaires 4, switches 5 and/or sensors 6, and the user interface 14 on the mobile device 8 via any suitable wired and/or wireless network, e.g. again via the Internet, a mobile cellular network, a WLAN and/or a local Ethernet network. For instance the controller 12 may form a connection comprising a leg via the Internet between the server and a wireless access point in the environment 2, and a further, wireless leg between the wireless access point and each of the luminaires 4, switches 5, sensors 6 and/or the user terminal 8.

In one particular example, the controller 12 may be implemented in the form of a web-based service accessed through a general-purpose web-browser application running on the user terminal 8.

When the controller 12 is implemented on a centralized entity such as a server or lighting bridge, the memory 16 used to store the lighting control rules 18 may comprise server or bridge's own memory, or may comprise a remote (external) memory such as on the user terminal 8 or another entity (e.g. a server provided by another party). In the case of a memory or the server or bridge's own memory, the controller 12 may be configured to read and write from the memory 18 via a connection over any wired and/or wireless network, e.g. via a WLAN, a local Ethernet network, a mobile cellular network and/or the Internet.

In further alternative embodiments, the controller 12 may be distributed between the mobile terminal 8 and the centralized entity (e.g. server or lighting bridge). For instance in embodiments the functionality of the controller 12 dealing with the user interface 14 may be implemented on the user terminal 8 whilst the functionality controlling the luminaires 4 and detecting the signals from the switches 5 and/or sensors 6 may be implemented on the server to bridge. In such embodiments the connections between the user terminal 8, server/bridge and various other components 4, 5, 6 may be implemented via any of the above described means.

In yet further alternative embodiments, the controller 12 may be implemented in a highly distributed form in embedded software or hardware logic distributed throughout multiple of the luminaires 4, switches 5 and/or sensors 6, and optionally also the user terminal 8. In such embodiments, the memory 16 on which the lighting control riles 18 are stored may be implemented in any one of the components 4, 5, 6, 8 or another component such as a server or lighting bridge, or may be distributed throughout multiple of any such components. In such embodiments the various connections involved in communicating between the various components 4, 5, 6, 8, 14, 16 may be implemented via any suitable wired and/or wireless technology, e.g. a ZigBee Mesh network.

In general, where any of the functionality herein involves communication between components 4, 5, 6, 8, 14, 16, these may be implemented via any of the above-mentioned wired and/or wireless means and/or other such means. For brevity the various options will not be repeated each time but it will be understood that such communication means are used.

As mentioned, embodiments of the present disclosure provide a mechanism by which a user can readily program lighting control rules 18 with little or no technical expertise or experience. To this end the controller 12 may be configured to conduct a method as follows.

To begin the process the user 10 selects an option presented through the user interface 14 on the mobile terminal 8 to enter the controller 12 into a "record mode", to begin recording user inputs that will be programmed to trigger a lighting response. Once in the record mode, the controller 12 is set so as to capture user inputs received through the actuators 5, 6 (e.g. switches 5 and/or sensors 6) as being targets for being programmed. Optionally the record mode could be excluded so that the controller 12 has this behavior unconditionally (e.g. whenever the app is open on the user terminal 8). However, an explicit record mode is preferred so as to mitigate unintentional recording of lighting control rules later when the lighting system in normal, everyday use.

Figure 3:
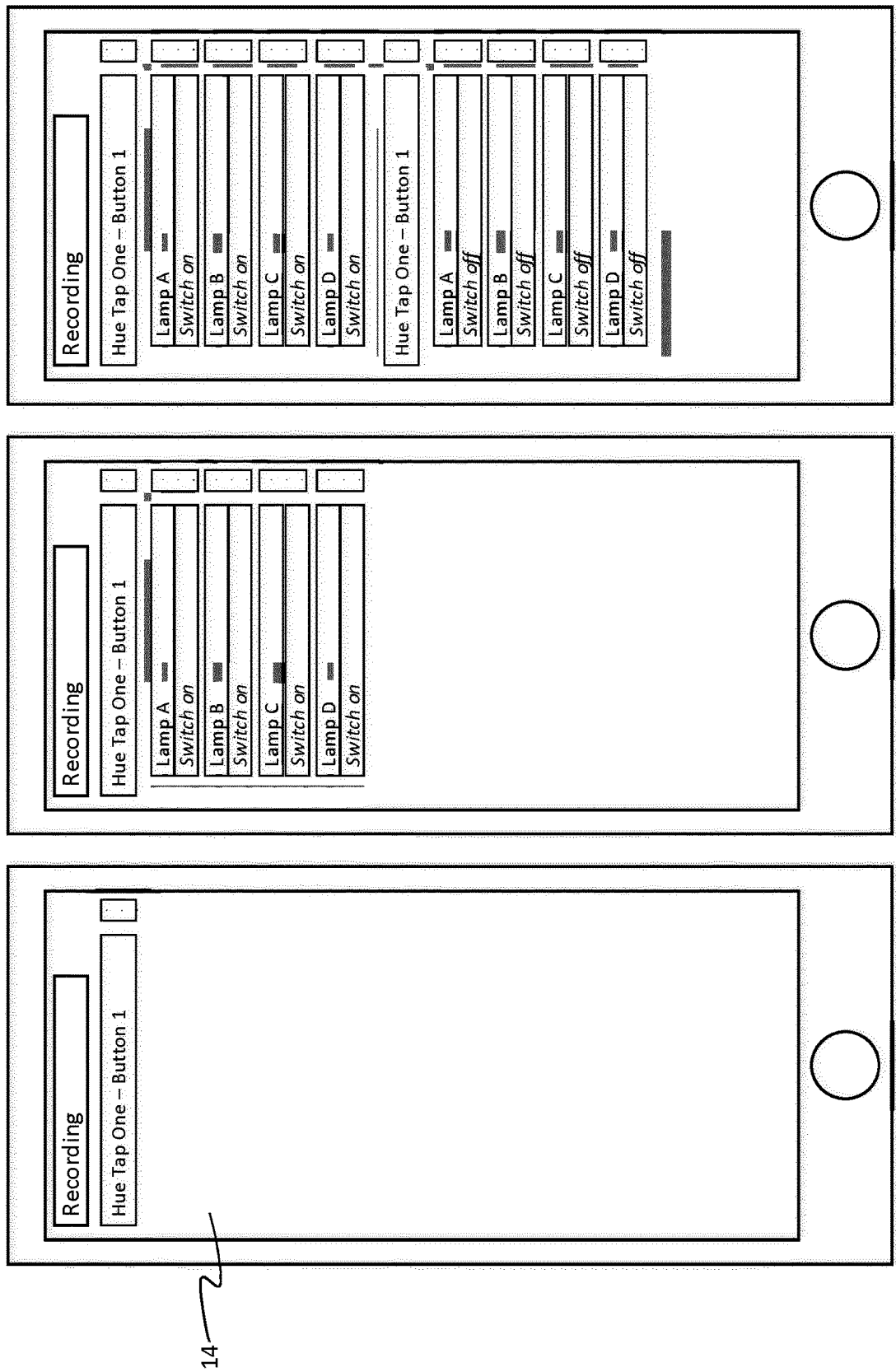
FIG. 3 is a schematic mock-up of an example user interface for programming a lighting control rule.

Reference is now made to FIG. 3 in addition to the previously-introduced FIGS. 1 and 2.

Once recording, the controller 12 detects whenever the user 10 actuates one of the actuators 5, 6. This may comprise for example the user pressing one of the switches 5 (or turning a dial, sliding a slider, etc.) or the user 10 walking into the field of view of one of the presence sensors 6. The controller 12 then presents a name or some other identification or the actuated actuator(s) 5, 6 to the user 10 through the user interface 14 of the mobile device 8. See for example the left-hand screen shot in FIG. 3.

In addition, the controller 12 presents to the user 10 through the user interface 14 a set of options for lighting behavior to be associated with the recently actuated actuator 5, 6. For instance the options may comprise multiple different ones of the luminaires 4 in the environment 2 or in the particular room 3 currently occupied by the user 10 or (which the controller 12 may be aware of through a pre-programmed commissioning database, or by detecting their proximity using the wireless interface between the controller 12 and the luminaires 4). Alternatively or additionally, the set of options may comprise multiple different lighting effects for a given one or more of the luminaires 4, e.g. turn on its illumination, turn off its illumination, dim up its illumination, dim down its illumination, change the color of its illumination, etc.

Note also that in some embodiments, the controller 12 could be implicated in the form of more than one application arranged to interface with one another. E.g. the programming functionality (the ability to associate actuators 5, 6 with selected lighting effects) may be implemented in one application provided by one party such as a provider of the lighting system and/or actuators, while the ability to select or design lighting effects through the user interface 14 may be implemented in another application provided by another party, such as a third party writing apps to accompany the lighting system provider's lighting system.

In the example of FIG. 3, the user 10 s presented with the option to associate the actuated activator 5, 6 with the turning on of the illumination from one or more of four available luminaries 4 (or even individual lamps within a luminaire, though note that the term "lamp" may be used colloquially by end-users to refer to what is technically a luminaire, so the menu may in fact use the more colloquial but technically incorrect terminology more familiar to end users).

When the user selects one of the presented options, the controller 12 then automatically associates the selected lighting behavior with the one or more actuated actuators 5, 6, and stores this association as one of the lighting control rules 18 in the relevant storage location 16 (e.g. local memory of the user terminal 8, in a lighting bridge, in a buildings controller or in a server). In embodiments the controller 12 performs this step on condition that the user selects one of the options within a predetermined time interval running from the time the user actuated the actuator (or at least when the controller 12 received the notification of the actuation from the actuator 5, 6). Otherwise the step times out such that the controller automatically cancels the programming of a rule 18 associated with the actuated actuator 5, 6, or even the process as a whole may time out (i.e. the programming mode is exited). Alternatively it is not exploded that there is no time-out feature such that the record mode is left pending indefinitely, or until the user manually cancels the step or manually exits the record mode.

In some cases, a lighting control rule 18 may also comprise a certain condition qualifying the performance of that rule, e.g. the switch 5 or sensor 6 will only trigger its programmed behavior after a certain threshold time of day, or after a certain threshold time of day, or inside or outside a certain time range. In such cases the controller 12, at the time of programming the rule 18, may also prompt the user 10 through the user interface 14 to input a value of one or more parameters qualifying the condition of the rule. E.g. in the case where the condition comprises a time of day before or after which the rule applies, or a range of times during or outside of which the rule applies, the user is prompted to input the threshold time or the range of times. As another variant of this, instead of the rule 18 either applying or not applying depending on the condition, the rule 18 may comprise different variants depending on the value of the condition, e.g. depending on time of day. For instance the user may program a switch 5 or sensor 6 will have a first effect before a certain user-specified time of day but a second behavior after, or a first effect during a certain user-specified range of times but a second behavior outside. E.g. a switch 5 or sensor 6 may be programmed so that before a certain user-specified in the evening it turns on its associated luminaire 4 to emit white light, but after the threshold time in the evening it instead turns on the luminaire 4 to emit a warmer colored light such as amber light.

Once the rule 18 is programmed then, in future, when the user actuates the programmed actuator(s) 5, 6 in an operational phase after then end of the record mode, the controller 12 will automatically enact the associated programmed lighting effect (e.g. turning on the associated luminaire or luminaires, or switching its or their color, etc.).

Preferably when the user 10 selects the desired behavior to associate with the one or more actuated actuators 5, 6, then as well as programming the rule 18, the controller 12 also automatically controls the selected luminaire(s) 4 to actually enact the selected lighting behavior. E.g. if the user 10 selects to turn on luminaire A, then as well as programming this function to be associated with the actuated actuator(s) 5, 6 when actuated in the future, this will also turn on the illumination from luminaire A at the present moment; or if the user 10 selects to set luminaires A-D to red, then as well as programming this function to be associated with the actuated actuator(s) 5, 6 when actuated in the future, this will actually cause luminaires A-D to emit red illumination at the present moment. Thus the end user 10 is advantageously provided with a system which he or she can program according to a "learning by doing" paradigm.

Optionally in some embodiments, or for some actuators 5, 6 or for some luminaires 4, the controller may enable a sequence of functions to be associated with successive actuations of an actuator 5, 6. Say for example the actuator in question is a switch or button 5. If the user presses the switch or button two or more times in succession (and in embodiments on condition of each press or actuation being within a predetermined time window running from the last), then the controller 12 presents the user 10 (again through the user interface 14) with the option to associate a different function with each successive press or actuation. E.g. in the example of FIG. 3, the first time the user 10 presses the switch 5, the controller 12 presents the user 10 with the option of associating the first press with the turning on of any one or more of four available luminaires A-D, whereas the second time the user 10 presses the switch, the controller 12 presents the user 10 with the option of associating this with the turning off of any one or more of the four available luminaires 4. The controller 12 then programs the user's selection as a rule 18 in the database 16, such that in future, in an operational phase after the end of the record mode, then when the user presses the switch 5 twice it will have a toggle behavior in accordance with the programmed rule.

As another example, the user could select that successive presses dim up the emitted illumination in degrees, or cycles through different color settings. Also a similar concept could be applied for presence sensors i.e. the first time the presence sensor is triggered this causes a first lighting effect, and the second time the presence sensor is triggered then this will case a second, different effect.

Furthermore, whether only a single actuation or a sequence of actuations are programmed for a given actuator 5, 6, the controller 12 is configured to allow the user 10 to continue programming further actuators 5, 6 in different zones 3 throughout the environment 2. For instance this may continue as long as the controller 12 is still in the record mode. Preferably, the controller 12 is configured to remember which actuators 5, 6 have already been programmed and refrain from presenting the user 10 with the option to reprogram these if actuated again during the same continuous session of the record mode. Or as variant of this the controller 12 may remember which zone(s) 3 the user 10 has already visited during the same continuous session of the record mode and refrain from presenting the user 10 with any options to program any actuator 5, 6 if actuated when the user 10 returns to the previously visited zone(s) 3. Such a feature is especially useful if one or more of the actuators are presence sensors 6.

Say for example the user 10 begins by selecting to start the record mode whilst presently in the living room 3a (refer again to FIG. 1). The user 10 then presses a light switch 5a or triggers a presence sensor 6a in that room, is presented with lighting behavior options through the user interface 14 of his or her mobile device 8, selects an option to program, and in embodiments also sees this lighting behavior actually enacted as it is programmed. The user then goes out into the corridor 3b where he or she presses another switch 5b or trips another presence sensor 6b. In response the user 10 is presented with another set of lighting behavior options, and again selects an option to program (and again preferably also sees this lighting effect actually rendered at the same time). Next, the user 10 goes from the corridor 3b into the kitchen 3c where the same procedure is repeated again.

Having programmed the lights in these rooms 3a-3c, the user 10 now wishes to program the lights in another room (not shown), e.g. perhaps another room on the ground floor or a room upstairs, e.g. on the landing or a room off the landing. This will involve the user returning back through the corridor 3b. In doing so, the user 10 will trip again the same presence sensor 6b already programmed the last time the user went through the corridor during this same session of the record mode, or perhaps the user 10 may reach for one of the same light switches 5b that was already programmed, simply to turn on the lights to find his or her way upstairs rather than because the user 10 wants to reprogram this. To accommodate this, preferably in embodiments the controller 12 is configured to store a record of the fact that the user 10 already programmed the switch 5b or sensor 6b in the corridor in the present session of the record mode, and/or that the user 10 already visited the corridor 3b during this session of the record mode. Based on this, the controller 12 will avoid presenting the user 10 with any more programming options as he or she passes through the corridor, until the user reaches the next new room or actuates a new, programmed actuator 5, 6.

Note however: not all embodiments include the feature of automatically ignoring previously programmed or encountered actuators 5, 6, or actuators in previously visited regions 3. For instance some actuators 5, 6 may be used in multiple behaviors. E.g. the user 10 may want presence in room X (e.g. hallway 3b) to cause dimmed light in room Y (e.g. living room 3a), in which case the user might wish to re-use the same sensor 6 that was already programmed when the user visited room X and taught the living room sensor 6 to switch on the living room. As another example, it might be desired that some lights between kitchen and living room switch on in case of motion in the kitchen as well as motion in the living room. Thus in embodiments, the controller 12 is not configured to refrain from offering the same actuators 5, 6 again.

As a variant of this, the controller 12 may be configured to provide the user with a choice to either 'ignore' actuators 5,6 that already have behavior assigned (or have already been encountered or that are in regions 3 that have already been visited) or to 'use everything' (do not ignore). The choice may for example be a user setting, or could be presented automatically each time the user 10 visits a previously visited area 3. In embodiments, the controller 12 may be configured to allow the user to modify a recording by adding and/or removing steps manually (see later).

Once the user 10 is finished programming all the desired behaviors in the environment (e.g. house or apartment) 2, the user 10 selects an option in the user interface 14 to end the record mode. In response the controller 12 places the system into the operational phase where actuating any of the actuators 5, 6 will now have the programmed effect. If the user 10 wishes to reprogram any behaviors, he or she can simply select through the user interface 14 to restart the record mode (this starting a new record session).

In some embodiments, the programming may be based on one or more templates. A template is a set of rules, schedules, and/or state variables with a parameterized set of sensors and actuators. The templates could be extracted for example from a lighting bridge's or server's collection of rules, schedules, and state variables controlling the same lights 4, e.g. either from a specific room 3 in the system, or recognized in the cloud as common behavior among a large set of users. Users can apply a template to a room 3 and have the sensors 6, light switches 5, and lights 4 in the room filled in as default.

As mentioned, creating home automation behavior can be difficult for novice users and requires technical expertise. For example, imagine a stairway where a single button 5 on the first floor and a single button 5 on the second floor can be used to toggle a light on and off when walking the stairs: a simple behavior that—when explained to someone—is easy to understand. However, to program this requires a state variable (for the toggle), rules to change the state when a button is pressed, and rules to change the lights if the state variable changes. The step from the conceptual idea to the implementation in the system is not trivial for the average user. Now imagine the lights should also be at a lower brightness at night, or switch off automatically after 5 minutes. These add more rules and schedules to the home automation behavior making it harder for the novice user to realize this behavior.

Nonetheless, various expert users may have already create relevant behavior for their homes. In embodiments, these are reused by offering them to other users, allowing the differences recognizable to the users (switches lights, timer values) to be configured. This would simplify setting up a home automation system as the step from conceptual model to implementation is shared across users. Additionally, other users can be inspired by the capabilities of their system by seeing what others have done. Further, based on the sensors and other actuators present in the system, a more user-friendly approach can be provided by suggesting switches and lights of the current or another room to be used.

A related problem is to know what behavior is relevant and/or possible for a specific room 3 or home. In embodiments, there is provided a cloud infrastructure to which multiple lighting systems are connected and which can detect common behavior in rooms with a similar set-up, and provide these as suggestions for a user's home. This will simplify finding relevant home automation behavior.

The templates for smart home applications may be created by an active development community, or by the manufacturer of the lighting technology. However, creating such a template can be complex and requires technical knowledge. In embodiments disclosed herein there is provided a simpler way of applying templates to a lighting system, by allowing people to show their system how they want it to behave. According to such embodiments there is provided an interface with a mixed initiative, whereby the user 10 can manually set specific behaviors, and the system makes suggestions to the user.

By way of illustration, a particular example involving the record mode and templates is now described with reference to FIGS. 3 to 6.

As mentioned, in embodiments the user 10 begins by activating a 'recording mode'. In the recording mode the user can tell the system how it should behave. For example, the user activates the recording mode and takes the following action: (I) Press a smart switch 5 or a certain button of the smart switch if it has more than one button, (II) switch on four lights 4 in the system through the user interface 14 of the mobile device 8, (III) press the switch again or press the same button of the switch 5, and (IV) use the user interface 14 of the mobile device 8 to switch off four lights in his system. Thus the user 10 teaches the system by performing the action(s) he or she wishes to program, and controlling the lights 4 in the way he or she wants to associate with the performed action(s). After that, the user deactivates the recording mode.

During the recording mode the steps that are added to the recording may be visualized to the user in a graphical user interface 14. FIG. 3 shows an example of such an interface. With every action the user takes, a new step is added in the recording. The figure shows how the example describe above might be visualized.

In embodiments, the next step is matching the user's selection to a template. Once the recording phase has ended the controller 12 knows which accessories should take part in the template. In the example above (see also FIG. 3) it knows that a certain switch 5 and two light states are used. It also knows the settings of the two light states (state 1: lights on, state 2: lights off) and the order of execution. With this information it can search a database of existing templates to find all templates that match these criteria. If a suitable template has been found the user 10 can select that template and the information that the user has provided will be entered into the template.

Another step may be to fine tune settings. The controller 12 may suggest templates, but the user 10 may also fine-tune the automatically recorded settings. Alternatively or additionally the user 10 may modify a recording by adding and/or removing steps manually In the example of FIG. 3 the user 10 switches on and off four lights 4. A user may do this by changing the state of all those lights 4 at once, or one by one. In this fine-tuning stage the user 10 may combine the four individual actions into a single action, such that when he or she presses the button 5 the four lights switch on together, instead of one by one. The user 10 may also delete erroneous recording events at this point in time.

To add temporal qualities, the user 10 may later add pauses and delays to the template. This would for example allow the user to make a 'delayed off-switch', by adding a pause into the template after pressing a button 5.

Figure 4:
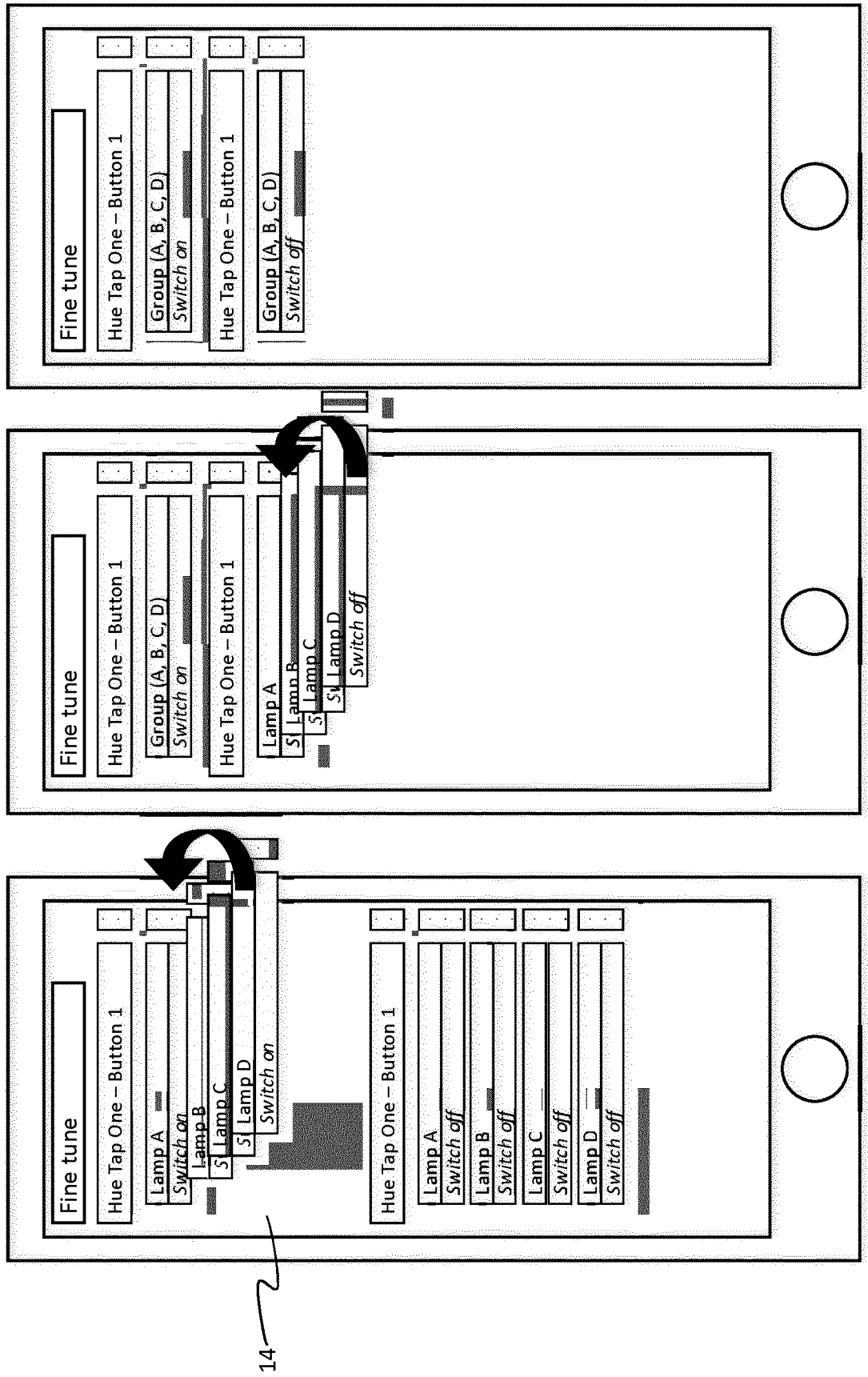
FIG. 4 is another schematic mock-up of an example user interface for programming a lighting control rule.

FIG. 4 shows an example of how the user 10 may fine tune the settings. In this example the user 10 combines the four individual commands into a single command to control the four lights 4 as a group (instead of one-by-one). In other embodiments this may be done automatically if the controller 12 has knowledge that the four lights are often controlled as a group, or the user during the recording phase controlled the lights as a group.

Additionally, the controller 12 may notice that the second sequence of actions contains the same four lights 4, only their states are different. It may therefore suggest to the user 10 to also group those lights. The user 10 may also do this himself.

As a further optional step, the user 10 may add state information. Here, in addition to fine-tuning the recorded settings, the user 10 can also enhance the recorded settings by adding conditional information about the state the system should be in. This could be (but is not limited to): time of day, or specific light state (on/off).

Figure 5:
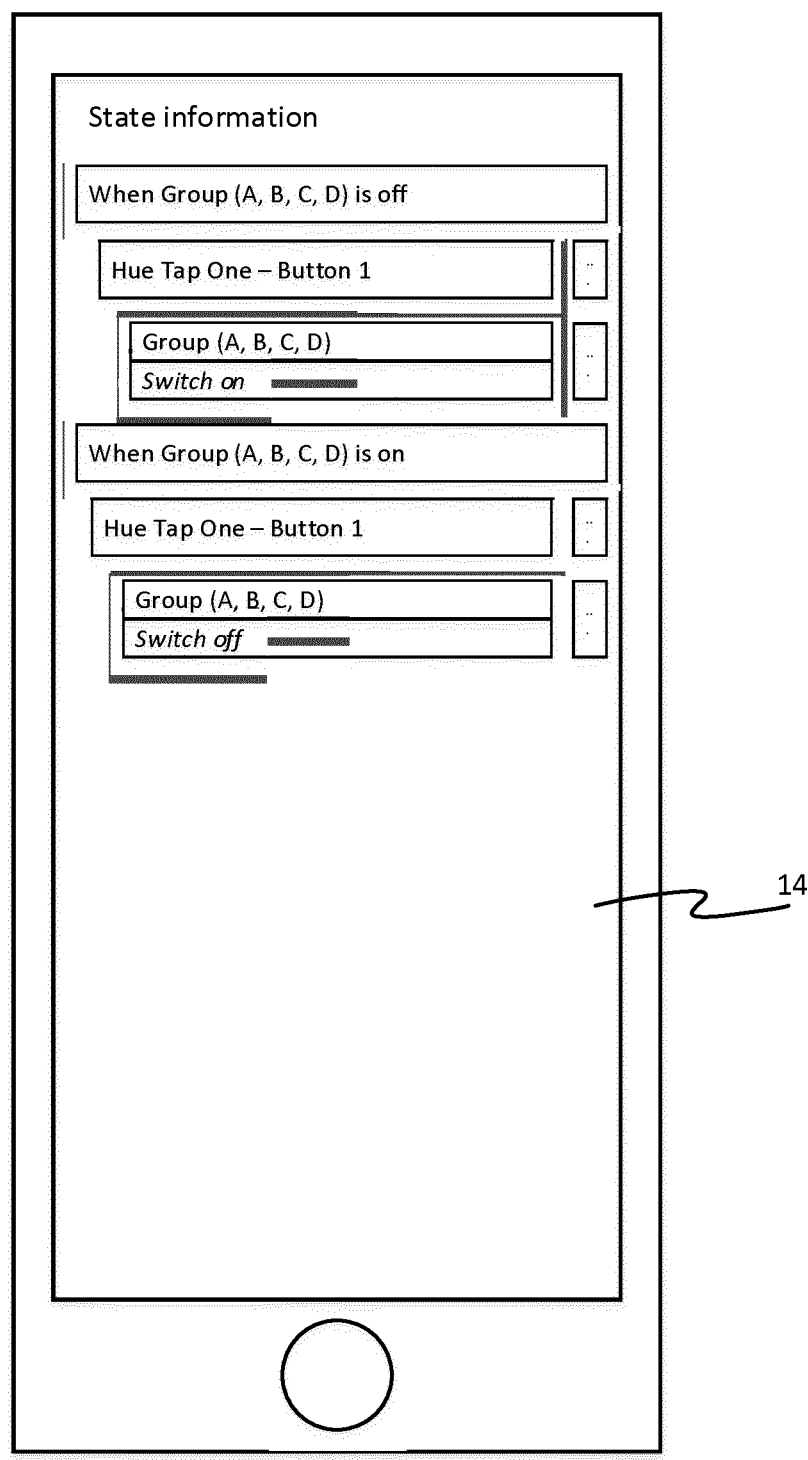
FIG. 5 is another schematic mock-up of an example user interface for programming a lighting control rule.
Figure 6:
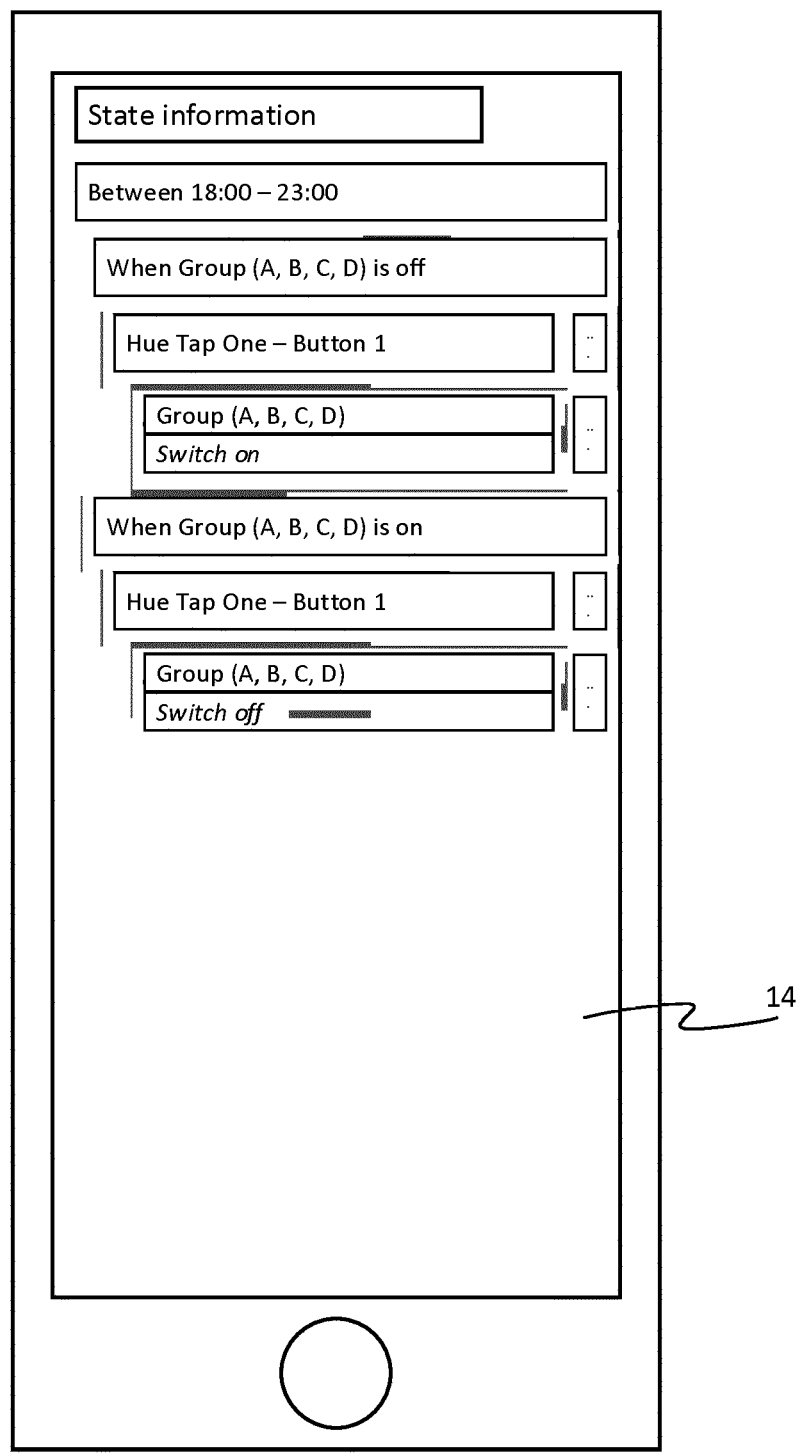
FIG. 6 is another schematic mock-up of an example user interface for programming a lighting control rule.

With regard to the state information, in embodiments the controller 12 may also add automatically computed state information. For example, since the controller 12 knows the full sequence of recording, it knows which devices 4, 5, 6 are part of the intended behavior. It can check commonalities in the states of each device. For example, it may find that when the button 5 was pressed the first time, all the lights 4 were off. It adds this as a state condition to the template. When the button was pressed the second time it finds that all lights were on (but not necessarily on the same color). It can automatically add these states to the template as is shown in FIG. 5.

The user may also add state information him- or herself, for example about states that are difficult for the controller 12 to determine itself, such as time of the day. See FIG. 6.

With the above-described process it is also possible to create more advanced behaviors. For example, the user 10 could create functionality which combines a sensor 6 and a switch 5. E.g. during the recording phase, the user 10 may perform the following actions:

Enter the room 3—motion sensor 6 goes to true
Turn on the lights in the room 3
Press 'on' button of a smart dimmer switch 5
Activate a lighting scene (e.g. "Concentrate") in the room 3
Press the 'on' button of the smart dimmer switch 5
Activate another scene (e.g. "Relax") in the room 3
Leave the room—motion sensors goes to false
Turn off the lights.

This will create a template whereby the user 10 can toggle between scenes (Concentrate and Relax) when he is in a given room 3 and presses the on-button of the switch 5 as the system automatically detects the devices that take part in the template and the sequence of actions.

In embodiments, the process of creating a template is as follows.

Record a sequence of actions fully.

Retrieve the individual devices 4, 5, 6 that take part in the template.

Each individual device knows its type and its capabilities.

Classify each recorded event as 'trigger' or 'action'

Input devices such as switches 5 or sensors 6 will typically be classified as 'triggers'.

Output devices such as luminaires 4 or lamps will typically be classified as 'actions'.

For each classified 'trigger' evaluate all the participating devices and find commonalities in their states. When the states remain stable over several recorded events, it may be added as state condition. For example: a sensor has motion 'true' for part of the sequence. It is likely that all actions that happened while the motion sensor is set to 'true' should only happen when the motion sensor is set to 'true'.

Present the outcomes to the user 10 in a graphical user interface 14 allowing him or her to adjust the settings.

Additionally, in embodiments, since the controller 12 knows the types of the devices that are used in the template, and the sequence of actions, it can suggest templates that are the same, or similar as the one that the user 10 recorded. These templates may be stored in a large database.

In the case where the controller 12 proposes templates from a database, the search can be optimized by considering the additional information in the system. For example, if the user 10 sets up behavior for a living room 3a the controller 12 can propose templates to him or her that are typically used in a living room.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of programming a respective rule for controlling lighting in each of one or more zones each being occupiable by a user, the method comprising:

detecting that a user has performed a first instance of a user interaction with one or more user-actuated actuators serving a zone presently occupied by the user, the user interaction comprising at least one actuation of each of the one or more actuators;

controlling one or more illumination sources, arranged to illuminate the zone presently occupied by the user, to output a desired light effect based on a user selection received through a user interface of a user terminal; and subsequently;

determining a rule specifying how the illumination emitted by the one or more illumination sources is to be controlled as a function of a subsequent instance of said user interaction;

programming the respective rule into a memory in association with the one or more actuators such that the subsequent instance of said user interaction causes reading said rule from the memory in order to automatically enact the rule and thereby control the illumination;

wherein said one or more zones are a plurality of zones, and wherein the method further comprises:

presenting a start control and a stop control to the user though the user interface, activating a record mode when the user activates the start control, and ending the record mode when the user activates the stop control;

wherein the method steps of detecting a user interaction, controlling one or more illumination sources, determining a rule and programming the rule into memory are repeated on condition of the record mode being activated, so as to automatically program the respective rules for the zones visited by the user during the record mode;

whereas when the record mode is deactivated then the subsequent instance of said user interaction automatically invokes the enacting of said rule to control the illumination.

2. The method of claim 1, wherein the method further comprises:

during the record mode, storing in the memory a record of the zones visited by the user and/or the actuators for which one of said rules has already been programmed; and when the user returns to one of the zones for which the respective rule is already programmed, recalling said record from memory in order to avoid reprogramming the respective rule.

3. The method of claim 1, wherein the user interaction comprises multiple actuations by the user of at least one of the one or more actuators, and said function comprises a different respective action to be triggered by each of the multiple actuations.

4. The method of claim 3, wherein the programming of the rule is performed on condition that the multiple actuations are performed within a predetermined time window relative to one another.

5. The method of claim 1, wherein the programming of said rule is performed on condition that the user selection and the first instance of the user interaction are performed within a time window relative to one another.

6. The method of claim 1, wherein said zones are different rooms of a building.

7. The method of claim 1, comprising receiving a user input through the user interface specifying a value of a parameter qualifying an additional condition of the rule.

8. A computer-program product comprising code embodied on non-transitory computer-readable storage media and configured so as when run on one or more processing units to perform operations in accordance with claim 1.

9. A lighting control device comprising a controller configured to perform operations in accordance with claim 1.

10. The method of claim 1, wherein:

at least one of said one or more actuators comprises a switch, button, dial or slider;

and the user interaction comprises the user pressing the switch or button, turning the dial or sliding the slider, respectively; and/or at least one of said one or more actuators comprises a presence sensor, and said user interaction comprises the user being sensed by the presence sensor.

\* \* \* \* \*